United States Patent [19]

Goggins

[11] 3,993,994
[45] Nov. 23, 1976

[54] ADAPTIVE CLUTTER CANCELLATION FOR SYNTHETIC APERTURE AMTI RADAR

[75] Inventor: William B. Goggins, Locke Mills, Maine

[73] Assignee: The United States of America as represented by the Secretary of the Air Force, Washington, D.C.

[22] Filed: June 27, 1975

[21] Appl. No.: 590,973

[52] U.S. Cl. ............................ 343/5 CM; 343/7 A; 343/7.7
[51] Int. Cl.² ........................................ G01S 9/42
[58] Field of Search .................. 343/5 CM, 7 A, 7.7

[56] References Cited
UNITED STATES PATENTS

| | | | |
|---|---|---|---|
| 3,725,922 | 4/1973 | Brennan et al. | 343/7.7 X |
| 3,727,220 | 4/1973 | Brennan et al. | 343/7.7 X |
| 3,735,399 | 5/1973 | Sletten et al. | 343/7.7 |
| 3,882,498 | 5/1975 | McGuffin | 343/7.7 X |

*Primary Examiner*—T.H. Tubbesing
*Attorney, Agent, or Firm*—Joseph E. Rusz; Willard R. Matthews, Jr.

[57] ABSTRACT

Clutter cancellation between adjacent channels of a multichannel synthetic aperture AMTI radar is accomplished by delaying signals from the forward channel to coincide with signals from the aft channel and subtracting the outputs. Adverse effects from unknown, uncalibrated and time varying parameters are compensated for by adjusting the phase and amplitude of the aft channel coherent receiver output in response to the complex multiplier signal $\hat{\omega}$. The synthetic aperture processing circuit outputs of each channel are averaged over many range cells and summed to determine clutter magnitude. The complex multiplier signal $\hat{\omega}$ is made to minimize the clutter magnitude by means of a steepest descent algorithm. A mathematical expression relating the complex multiplier signal $\hat{\omega}$ to clutter magnitude for optimum clutter cancellation is developed and a circuit is provided for mechanizing the process.

2 Claims, 1 Drawing Figure

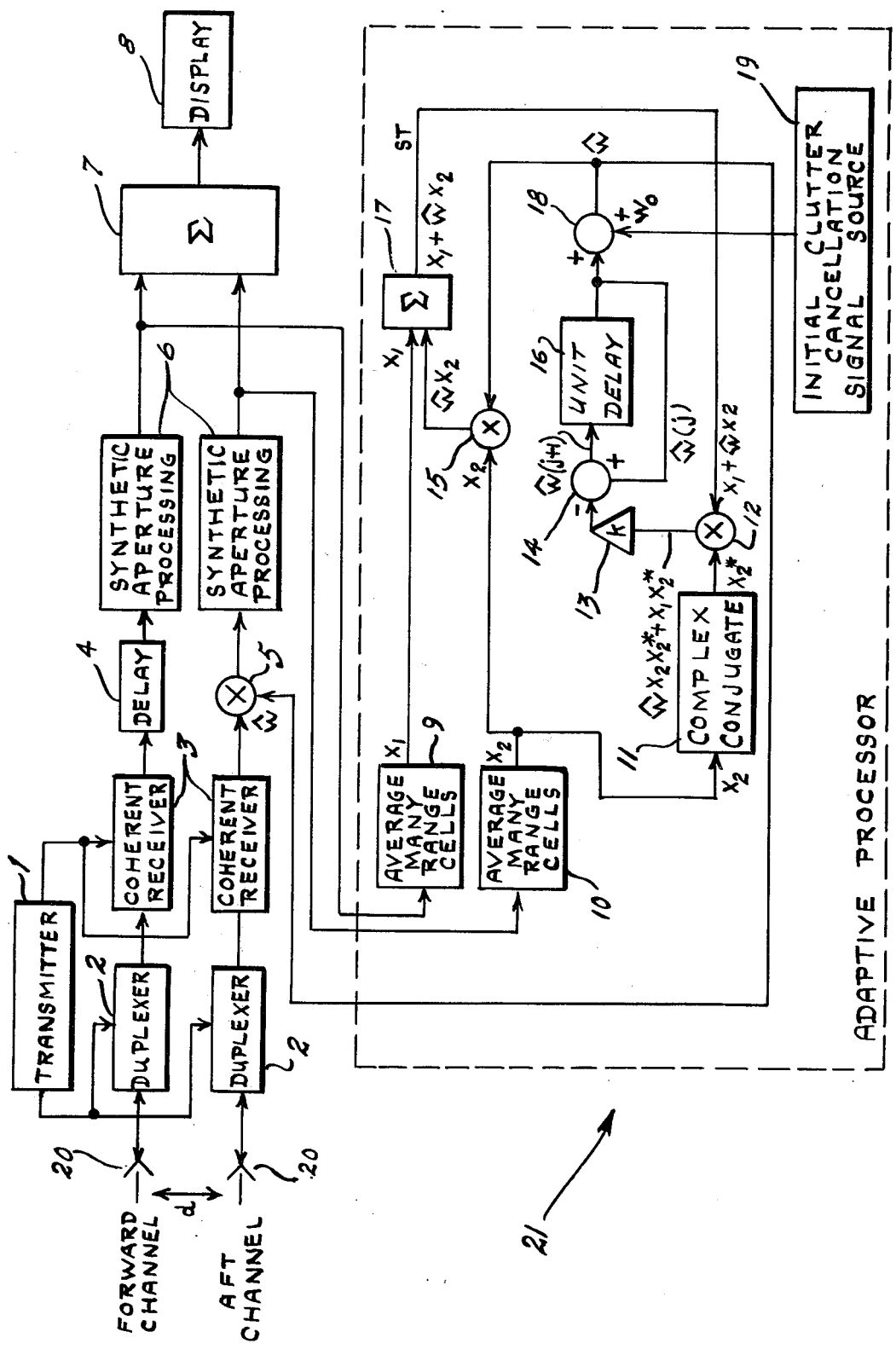

ADAPTIVE CLUTTER CANCELLATION FOR SYNTHETIC APERTURE AMTI RADAR

STATEMENT OF GOVERNMENT INTEREST

The invention described herein may be manufactured and used by or for the Government for governmental purposes without the payment of any royalty thereon.

BACKGROUND OF THE INVENTION

This invention relates to AMTI synthetic aperture radars, and in particular to means for improving the clutter cancelling capabilities of the clutter cancelling circuits employed in such systems. Radar systems of the type to which the invention can be applied are disclosed in the patent of Sletten, Et Al, entitled "AMTI RADAR CLUTTER CANCELLING METHOD AND APPARATUS," U.S. Pat. No. 3,735,400, filed May 22, 1973; and in the copending patent application of William B. Goggins, Jr., entitled "METHOD AND APPARATUS FOR IMPROVING THE SLOWLY MOVING TARGET DETECTION CAPABILITY OF AN AMTI SYNTHETIC APERTURE RADAR," Ser. No. 563,009, filed 27 Mar. 1975. Radar systems of this type achieve clutter cancellation by receiving radar returns on multiple channels from receiving antennas disposed at discrete distances along the flight velocity vector of the AMTI radar bearing aircraft. The returns of some antennas are delayed in order to achieve return signal coincidence, and the processed returns of adjacent channels are subtracted to eliminate clutter. In order to achieve effective clutter cancellation, however, it is necessary in these and other state-of-the-art systems, that the physical antenna patterns of the system be carefully matched and that the synthetic aperture processors of each channel be exactly the same. Clutter cancellation in these systems can also be degraded or destroyed because of unknown, uncalibrated and time varying parameters.

SUMMARY OF THE INVENTION

Clutter cancellation between adjacent channels of a multichannel synthetic aperture AMTI radar is achieved by adjusting the receiver output of the aft channel with a clutter cancellation adjustment signal $\hat{\omega}$. Clutter cancellation adjustment signal $\omega$ is generated by an adaptive processor from inputs consisting of the averaged outputs of the synthetic aperture processing circuits of each channel and an initial clutter cancellation signal $\omega_0$. Initial clutter cancellation signal $\omega_0$ is precomputed to provide maximum clutter cancellation when all parameters are in a nominal state. The adaptive processor continually computes the clutter magnitude (ST) and develops the clutter cancellation adjustment $\omega$ that minimizes it. The adaptive processor accomplishes this by mechanizing the mathematical expression $$\hat{\omega}(j+1) = \hat{\omega}(j) - k \frac{|S_T|^2}{\hat{\omega}^*}$$

in which $\omega(j)$ denotes the value of $\omega$ after the $j^{th}$ step in the optimization process and the symbol * denotes a complex conjugate.

It is a principal object of the invention to provide a new and improved AMTI synthetic aperture radar.

It is another object of the invention to provide an AMTI synthetic aperture radar having improved adaptive clutter cancellation capabilities.

It is another object of the invention to provide an AMTI synthetic aperture radar with clutter cancelling means that does not require careful matching of physical antenna patterns.

It is another object of the invention to provide an AMTI synthetic aperture radar with clutter cancelling means that does not require identical synthetic aperture processing circuits.

It is another object of the invention to provide an AMTI synthetic aperture radar with clutter cancelling means having an adaptive circuit that automatically compensates for the adverse effects of unknown, uncalibrated and time varying parameters.

These, together with other objects, features and advantages of the invention will become more readily apparent from the following detailed description taken in conjunction with the illustrative embodiment in the accompanying drawing.

DESCRIPTION OF THE DRAWING

The sole FIGURE of the drawing is a block diagram of one presently preferred embodiment of the invention.

DETAILED DESCRIPTION OF THE PREFERRED EMBODIMENT

Referring now to the FIGURE, the transmitter 1, duplexers 2 and coherent receivers 3 constitute a two-channel coherent radar system. The two antennas 20 are separated along the line of flight of the aircraft by a distance d. For best results the PRF of the transmitter 1 should be such that there are an integral number of interpulse periods during the time the aircraft flies the distance $d$. The output of the receiver connected to the leading antenna is delayed by this length of time by delay means 4. This channel then passes through synthetic aperture processing circuit 6. Data from the aft antenna channel is multiplied by clutter cancellation adjustment signal $\hat{\omega}$ in the complex multiplier 5 and its data passes through a similar synthetic aperture processor circuit 6. The synthetic aperture processors need not be matched. The outputs of the synthetic aperture processors are coherently summed, range cell by range cell, in the summing network 7 and displayed by display 8. By performing the complex multiplication by $\hat{\omega}$ the phase and amplitude of the aft channel signals are adjusted for best clutter cancellation. This complex multiplier signal $\hat{\omega}$ is generated and updated in the adaptive processor 21. This is accomplished in the following way. The outputs of the synthetic aperture processors 6 are averaged over many range cells by averaging means 9, 10. The purpose of this is to make the adaptive processor 21 react to the distributed clutter rather than to a target that may appear in just one range cell. The purpose of the adaptive processor is to minimize the clutter averaged over many range cells. The magnitude of this clutter is given by $$|S_T| = |X_1 + \hat{\omega} X_2|. \tag{1}$$

It is more convenient in this case to minimize $|S_T|^2$. Choosing $\hat{\omega}$ to minimize $|S_T|^2$ is the equivalent to choosing $\hat{\omega}$ to minimize $|S_T|$. One way to do this is to use the steepest descent algorithm which is well known in the field of mathematics. This is, $\hat{\omega}$ should be adjusted such that $$\hat{\omega}(j+1) = \hat{\omega}(j) - k \frac{\lambda |S_T|^2}{\lambda \hat{\omega}^*} \quad (2)$$

where $\hat{\omega}(j)$ denotes the value of $\hat{\omega}$ after the $j^{th}$ step in the optimization process. The quantity $|S_T|^2 \lambda \hat{\omega}^*$ is the gradient. The symbol * denotes complex conjugate. The scalor $k$ determines the size of the step to be taken and the gradient determines the direction of the step. The square of the output is given by $$S_T S_T^* = (X_1 + \hat{\omega} X_2)(X_1^* + \hat{\omega}^* X_2^*). \quad (3)$$

Multiplying yields $$S_T S_T^* = X_1 X_1^* + \hat{\omega} \hat{\omega}^* X_2 X_2^* + X_1 \hat{\omega}^* X_2^* + X_1^* \hat{\omega} X_2. \quad (4)$$

Differentiation yields $$\frac{\lambda(S_T S_T^*)}{\lambda \hat{\omega}^*} = \hat{\omega} X_2 X_2 + X_1 X_2^*. \quad (5)$$

This is seen to be $$\frac{\lambda(S_T S_T^*)}{\lambda \hat{\omega}^*} = X_2 \, ST. \quad (6)$$

The adaptive processor 21 mechanizes this algorithm. The output of the summing network 17 which sums the outputs of averaging means 9 and complex multiplier 15 is $$S_T = X_1 + \hat{\omega} X_2. \quad (7)$$

This passes through complex multiplier 12 where it is multiplied by $X_2^*$, the output of complex conjugate device 11, to yield the gradient of equation (5). The gradient is scaled by $k$ (scalor device 13) to give the last term of equation (2). The output of the summer 14 fed by the signal from scalor 13 is $\hat{\omega}(j+1)$. The output of the unit delay 16 is then $\hat{\omega}(j)$ and is fed back to mechanize the rest of equation (2). This signal is then summed by summer 18 with an initializing signal $\omega_0$ which is precomputed in signal source 19 to give maximum clutter cancellation when all parameters are in a nominal state. By properly setting $\omega_0$ the initial adjustments of the loop are kept small and small step sizes may be used.

While the invention has been described in one presently preferred embodiment, it is understood that the words which have been used are words of description rather than words of limitation and that changes within the purview of the appended claims may be made without departing from the scope and spirit of the invention in its broader aspects.

What is claimed is:

1. In combination with a multichannel AMTI synthetic aperture radar system in which each channel includes a receive antenna, a coherent receiver connected thereto and a synthetic aperture processing circuit connected to process the output of said coherent receiver, clutter cancellation means for optimizing clutter cancellation between two adjacent channels comprising means for delaying the output of the forward channel coherent receiver,
means for averaging the outputs of the adjacent channel synthetic aperture processing circuits over a multiplicity of range cells,
means for generating a clutter cancellation adjustment signal,
a first multiplier means for multiplying the clutter cancellation adjustment signal $\hat{\omega}$ with the output of the aft channel coherent receiver,
a second multiplier means for multiplying the averaged output of the aft channel synthetic aperture processing circuit with the clutter cancellation adjustment signal $\hat{\omega}$, and
means for summing the product of said second multiplier means and the averaged output of the foward channel synthetic aperture processing circuit to obtain a clutter magnitude signal $S_T$, said clutter cancellation adjustment signal $\hat{\omega}$ being related to said clutter magnitude signal $S_T$ in accordance with the expression $$\hat{\omega}(j+1) = \hat{\omega}(j) - k \frac{\lambda |S_T|^2}{\lambda \hat{\omega}^*}.$$

2. In combination with a multichannel AMTI synthetic aperture radar system in which each channel includes a receive antenna, a coherent receiver connected thereto and a synthetic aperture processing circuit connected to process the output of the coherent receiver, means for maintaining optimum clutter cancellation between two adjacent channels comprising a delay means connected between the forward channel coherent receiver and synthetic aperture processing circuit,
a first complex multiplier having two inputs and an output, a first input thereof being connected to the aft channel coherent receiver and the output being connected to the aft channel synthetic aperture processing circuit,
a first signal averaging means connected to the output of the forward channel synthetic aperture processing circuit,
a second signal averaging means connected to the output of the aft channel synthetic aperture processing circuit,
a signal complex conjugate transform means,
a scalor constant means,
second and third complex multipliers each having two inputs and an output,
first, second and third summing means, each having two inputs and an output,
a unit delay means, and an initial clutter cancellation signal source, the output of said first signal averaging means being connected to a first input of said third summing means, the output of said second signal averaging means being connected to said signal complex conjugate transform means and to a first input of said third complex multiplier, said second complex multiplier having its first input connected to the output of said signal complex conjugate transform means and its second input connected to the output of said third summing means, the output of said third complex multiplier being connected to the second input of said third summing means, said scalor constant means being connected between the output of said second complex multiplier and a first input of said first summing means, said unit delay means being connected between the output of said first summing means and a first input of said second summing means, said first input of said second summing means being connected to the second input of said first summing means, said second summing means having its second input connected to said initial clutter cancellation signal source and its output connected to the second input of said third complex multiplier and to the second input of said first complex multiplier.

* * * * *